J. W. BOPE.
Harvester.
No. 45,905. Patented Jan. 17, 1865.
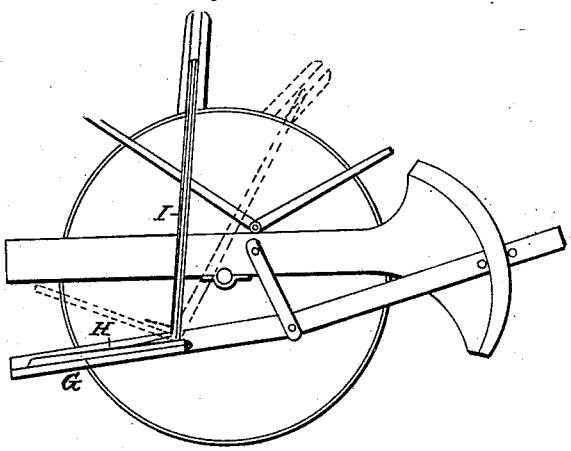
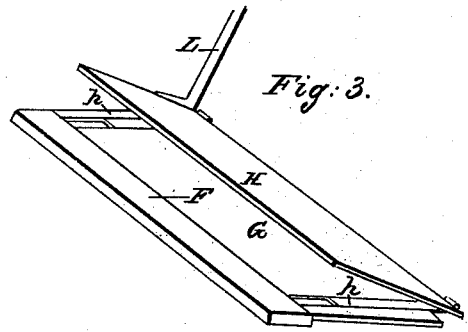
Witnesses:
D. M. Connel
J. B. Woodruff
Inventor:
J. W. Bope.

UNITED STATES PATENT OFFICE.

JACOB W. BOPE, OF ST. LOUIS, MISSOURI.

IMPROVEMENT IN HARVESTERS.

Specification forming part of Letters Patent No. 45,905, dated January 17, 1865.

*To all whom it may concern:*

Be it known that I, JACOB W. BOPE, of the city and county of St. Louis, in the State of Missouri, have invented a new and useful apparatus for dropping grain in gavels for reapers; and the following is a full, clear, and exact description of the same, reference being had to the accompanying drawings, making a part of this specification, in which—

Figure 1 represents a side view of a reaper with the dropper attached. Fig. 2 represents a detached view of the sliding hinged platform-dropper, in perspective.

My invention consists in the construction and the arrangement of a sliding platform to receive the cut grain, the same being hinged at the rear edge so that it may be moved on the frame or table, which is secured to the finger-bar to suit the length of the grain, and so operated by a lever attached thereto as to raise up the front or forward edge and arrest the falling grain while the gavel is being dropped, the inclination being such as to slide the grain upon the ground in a straight line.

To enable others skilled in the art to make and use my apparatus for dropping grain in gavels, I will describe it more fully, referring to the drawings and to the letters of reference marked thereon.

To the rear of the finger-bar F of a reaper or harvesting machine, I secure my improved dropping apparatus, which consists of a light frame or table, G, on the top of which is placed another table or platform, H, upon which the cut grain falls, the platform H being so hinged and secured to sliding bars *h h*, which are fitted into dovetailed grooves in the frame G, that the grain receiver and dropper may be adjusted so as to accommodate the length of the cut straw, just allowing the heads of the grain to reach out beyond the dropper.

The table or platform, being hinged at or near its rear edge, is operated by a vertical lever, I, that is secured to it, so that by any suitable device connected with it the driver, in his seat, can easily, by the foot, lift the front edge of the platform H to such an angle or inclination that the grain, when a sufficient quantity has accumulated on the platform to make a gavel, will slide off in a direct line and lie straight in the best possible condition for binding into sheaves. At the moment the front edge of the table or platform H is raised for the purpose of dropping the gavel it arrests the falling grain upon its edge, and makes the most perfect separator or cut-off between it and the gavel, the grain by its weight also aiding the dropper to resume its horizontal position. Thus the cut-off and dropper are one and the same thing.

Having thus fully described my invention and its operation, what I claim as new, and desire to secure by Letters Patent, is—

The adjustable sliding platform or dropper hinged at or near its rear edge, as described, so that by the raising of the front edge it performs the twofold function of dropping the gavel and at the same time operating as a perfect cut-off to arrest the falling grain.

J. W. BOPE.

Witnesses:
   J. M. CONNEL,
   J. B. WOODRUFF.